(12) United States Patent
Stanley (10) Patent No.: US 7,601,376 B2
(45) Date of Patent: Oct. 13, 2009

(54) PRESERVATION OF PRODUCE

(75) Inventor: Roger Anthony Stanley, Auckland (NZ)

(73) Assignee: The Horticulture and Food Research Institute of New Zealand Limited, Auckland (NZ)

( * ) Notice: Subject to any disclaimer, the term of this patent is extended or adjusted under 35 U.S.C. 154(b) by 585 days.

(21) Appl. No.: 10/487,263

(22) PCT Filed: Aug. 29, 2002

(86) PCT No.: PCT/NZ02/00168

§ 371 (c)(1),
(2), (4) Date: Aug. 24, 2004

(87) PCT Pub. No.: WO03/017773

PCT Pub. Date: Mar. 6, 2003

(65) Prior Publication Data

US 2004/0265441 A1 Dec. 30, 2004

(30) Foreign Application Priority Data

Aug. 30, 2001 (NZ) ........................... 513899
Aug. 31, 2001 (NZ) ........................... 513936

(51) Int. Cl.
*A23B 7/15* (2006.01)

(52) U.S. Cl. ............... 426/248; 426/270; 426/331; 426/333; 426/518

(58) Field of Classification Search ............... 426/248, 426/270, 331, 333, 506, 518, 520, 615; *A23B 7/15*
See application file for complete search history.

(56) References Cited

U.S. PATENT DOCUMENTS

| 1,754,434 | A | | 4/1930 | Perino | |
|---|---|---|---|---|---|
| 2,258,765 | A | * | 10/1941 | James | 426/248 |
| 2,401,131 | A | | 5/1946 | Bensel | 99/182 |
| 2,503,663 | A | * | 4/1950 | Gericke | 426/308 |
| 3,008,838 | A | * | 11/1961 | Brunsing et al. | 426/302 |
| 3,978,235 | A | * | 8/1976 | Schiro | 426/335 |
| 4,140,649 | A | * | 2/1979 | Bossert et al. | 426/286 |

(Continued)

FOREIGN PATENT DOCUMENTS

EP 0164285 12/1985

(Continued)

OTHER PUBLICATIONS http://www.ars.usda.gov/is/np/fnrb/fnrb1006.htm#apples p. 4 2006.*

(Continued)

*Primary Examiner*—Drew E Becker
*Assistant Examiner*—Steven Leff
(74) *Attorney, Agent, or Firm*—Jacobson Holman PLLC (57) ABSTRACT

Food safety and longevity of still respiring fruit or vegetable pieces are enhanced reliant on a treatment process where the cut surfaces (preferably cleaned of cell debris) are subjected to both UV light irradiation and heating so as, in concert, render the surfaces more sterile. The heating also has the effect of reducing ethylene production and at least depressing respiration. Such a process is preferably in addition to an anti-oxidant impregnation. The overall process in its preferred forms significantly extends the life and apparent freshness of, for example, apple slices when kept post treatment (eg; 25 days) over the temperature range of from 0° C. to 8° C.

35 Claims, 1 Drawing Sheet

U.S. PATENT DOCUMENTS

| | | | | |
|---|---|---|---|---|
| 4,255,459 | A | | 3/1981 | Glen .......................... 426/521 |
| 4,814,192 | A | * | 3/1989 | Sapers et al. ................ 426/268 |
| 4,975,293 | A | * | 12/1990 | Hicks et al. ................. 426/271 |
| 5,318,788 | A | * | 6/1994 | Yokota et al. ............... 426/268 |
| 5,364,645 | A | * | 11/1994 | Lagunas-Solar et al. .... 426/248 |
| 6,132,784 | A | * | 10/2000 | Brandt et al. ................ 426/248 |
| 6,150,663 | A | * | 11/2000 | Rosenthal ................... 250/435 |
| 2002/0051840 | A1 | * | 5/2002 | Andersen et al. ............ 426/541 |

FOREIGN PATENT DOCUMENTS

| | | |
|---|---|---|
| EP | 1010368 | 6/2000 |
| FR | 73800 | 1/1961 |
| FR | 1315925 | 4/1963 |
| GB | 272775 | 6/1927 |
| GB | 279487 | 1/1929 |
| JP | 63036740 | 2/1988 |
| JP | 5/041944 | 2/1993 |
| JP | 6/090660 | 4/1994 |
| JP | 6/245696 | 9/1994 |
| JP | 06245696 A * | 9/1994 |
| JP | 7/111875 | 5/1995 |
| JP | 9/154481 | 6/1997 |
| JP | 11/018740 | 1/1999 |
| WO | WO95/28846 | 11/1995 |

OTHER PUBLICATIONS

Abstract HU 35159.*
JP 06245696 machine translation.*
www.wikipedia.org/wiki/blanching 2008.*

Abstract of JP 63036740A (Potsuka Corp:KK), Feb. 17, 1998.
Abstract of Padwal-Desai et al, Acta Alimentaria Academiae . . . , 1973, pp. 189-207, Heat and radiation combination for . . . .
J. Farkas, Food Control, vol. 1, No. 4, 1990, pp. 223-229, Combination of irradiation with mild heat treatment.
J. Mercier et al, Food Research Int'l 27, 1994, pp. 401-404, Effect of food preparation on the isocoumarin, . . . .
J. Mercier et al, Jour of Phytopathology 137, 1993, pp. 44-54, Induction of 6-methoxymellin and resistance to storage . . . .
Padwal-Desai S.R. et al, Acta Academiae Scientiarum . . . , vol. 2, No. 2, 1973, 1 pg containing abstract, Heat and radiation . . . .
Farkas, Food Control, vol. 1, No. 4, 1990, pp. 223-229, Combination of irradiation with mild heat treatment.
Mercier et al, Food Res. Intl., vol. 27, 1994, pp. 401-404, Effect of food preparation on the isocoumarin, 6-methoxymellein.
Mercier et al, J. Phytopathology, vol. 137, 1993, pp. 44-54, Induction of 6-Methoxymellein and Resistance to Storage . . . .
Journal of Food Science, vol. 58, No. 5, 1993, pp. 1111-1114, 1124, "Apple Cultivar Variations in Response to Heat Treatment and Minimal Processing", D. M. Kim et al.
Instituto Nacional de Engenharia e Tecnologia Industrial, Lisboa, Portugal, pp. 599-601, "Efeito dos tratamentos térmicos brandos na cor e textura de pêra "Rocha" minimamente processada", Abreu M. et al.
Postharvest Biology and Technology 30 (2003) 153-160, "Use of mild heat pre-treatments for quality retention of fresh-cut 'Rocha' pear", Marta Abreu et al.

* cited by examiner

PRESERVATION OF PRODUCE

This is a nationalization of PCT/NZ02/00168 filed Aug. 29, 2002 and published in English.

TECHNICAL FIELD

The present invention relates to methods of preserving produce, viz fresh fruit and/or fresh vegetables and in particular peeled, cut, sliced and/or the like fruit and/or vegetables.

BACKGROUND ART

Fresh fruit and fresh vegetables deteriorate in most conditions encountered between harvest and ultimate consumption. This is more so where the fruit or vegetable has been subjected to a mechanical treatment that wounds such as peeling, coring, slicing, dicing and/or the like (hereafter "slicing") and even more so when thereafter the produce is not refrigerated constantly.

By way of example mechanically treated fruits (e.g. apple slices) deteriorate rapidly in respect of a number of criteria following mechanical treatment (e.g. slicing) [e.g. taste, texture, browning, other visible spoilage and safety] and more so in "abusive" temperature conditions, i.e. above refrigeration temperatures such as 4° C. or above.

The apple hereafter will be used as an example of a fruit is subject to challenges which will adversely affect taste, texture, visible spoilage and food safety.

Many prior art procedures have been proposed for improving the performance of fresh fruit in refrigerated and/or unrefrigerated conditions but none adequately deals with fresh fruit or fresh vegetables where there is a mechanical disruption of the fruit or vegetable and where there is a prospect that downstream of such treatment there is a prospect of subjection at some stage to at least an abusive temperature range that may allow the growth of spoilage or pathogenic organisms and/or promote the deterioration of the product quality so it is unacceptable for eating. For example, where a fruit such as an apple is treated, there is the prospect downstream of its abuse by a manufacturer of abuse between the manufacturer and a distributor, at the distributor's premises, between the distributor and the retail outlet, in the store of the retail outlet, between the store and the display cabinets of the retail outlet, during display at the retail outlet, and between such display and the ultimate consumption away from the retail outlet by the customer.

Inherent also in at least most fresh fruit and at least most fresh vegetables is enzymatic browning which customarily has been addressed by treatments such as immersion and/or spraying with anti-browning agents such as calcium ascorbate or equivalent compositions which have the effect of inhibiting the polyphenol oxidase reaction to provide a protective effect.

An example of such a "calcium ascorbate" treatment is that of Mantrose Haeuser Co., Inc., disclosed in their U.S. Pat. No. 5,925,395 (in respect of vegetables) and U.S. Pat. No. 5,939,117 (in respect of fruit such as apples). These U.S. patents are hereby included by way of reference.

Other anti-browning treatments involving ascorbic acid and calcium ions include Ponting, J. D; Jackson, R; Watters, G. "Refrigerated Apple Slices: Preservative Effects of Ascorbic Acid, Calcium and Sulphites" Journal of Food Science, 1972, Vol. 37, 3, 434-436, Toivonen, P. M. A. "The Reduction of Browning in Parsnips" Journal of Horticultural Science, 1992, Vol. 67, 4, 547-551 and Mastrocola, D; Pittia, P, Lerici, C. R. "Quality of Apple Slices Processed by Combined Techniques" Journal Food Quality. Trumbull, Conn.: Food & Nutrition Press. April" 1996, 133-146.

In the last mentioned journal article (Mastrocola et al.) the effectiveness of single pre-treatments and combinations of pre-treatments on the prevention of enzymatic browning during freezing and thawing of apple slices was investigated. It discloses a combination of blanching and dipping, either of which alone could not control enzyme activity. They found the blanching of apple slices caused a significant decrease of firmness even before any freeze-thawing phase.

There has been disclosure of heat treatment regimes for fresh fruit and vegetables. In this respect I refer to Kim, D. M.; Smith, N. L.; Lee, C. Y. "Apple Cultivar Variations in Response to Heat Treatment and Minimal Processing" Journal of Food Science 1993, Vol 58, 5, 1111-1114, Kim, D. M.; Smith, N. L.; Lee, C. Y.; "Effective Heat Treatment on Firmness of Apples and Apple Slices" Journal of Food Processing and Preservation 1994 Vol 18, 1, 1-8 and C. O. Perera, C.Rollin, E. A. Baldwin, R. A. Stanley, M. S. Tian (2001) "Minimally processed Apple: Inhibitory effects of heat treatment on respiration and ethylene production", Abstract 6 Session 96 IFT Annual Meeting New Orleans, Jun. 22-27 2001.

There has also previously been disclosure of the use of high energy electro magnetic radiation such as UV light or ionising radiation (e.g. gamma rays) for the preservation of fruit and/or vegetables. In this respect I refer to Chong Chon, Kim; "The Influence of Heat, Ultraviolet and Ethylene Absorber Treatments on Storage Life in Fuji Apples" Journal of the Korean Society for Horticultural Sciences, 1997, Vol. 38, 2, 153-156.

None of the prior art procedures however hitherto has satisfied a desire for a treatment procedure for fruit and/or vegetables that preferably is devoid of sulfites or other preservatives, and which satisfies food safety requirements as well as maintaining flavour, crispness and appearance where the fruit and/or vegetable has been subject to a mechanical treatment such as slicing and subsequently subjected to temperatures greater than 4° C. during storage and consumption.

The present invention in one of its aspects is directed to a method of treatment which will lead to improved shelf life over a procedure as disclosed in the aforementioned U.S. patents and provide over such an extended period a retention of flavour and texture whilst satisfying requirements for little or no browning nor other visible spoilage (such as that which is microbial—whether fungal and/or bacterial) and whilst satisfying food safety requirements insofar as, for example, micro organisms (such as Listeria) is concerned.

It is still another aspect of the present invention to provide an anti browning treatment which, if desired, can be integrated into an extended shelf life procedure or the extended shelf life procedures of the present invention.

We have determined a procedure that is applicable for fruits such as apples but is equally applicable to other fruits (such as pears and persimmons), and which is applicable to vegetables (such as, for example, squash, pumpkin, carrot and radish) which has an ability to improve shelf life of "sliced" (meaning any mechanically reduced pieces of some integrity) material for a period of say 21 days at low temperature but without a requirement for constant refrigeration below 4° C.

It is to this and any aspects of this that the present invention is directed.

SUMMARY OF THE INVENTION

Accordingly, in a first aspect the present invention consists in a method of enhancing food safety and longevity (collectively hereafter "preserving") of fresh fruit and/or fresh vegetables (hereafter the "produce") that has been subject to a mechanical reduction (ie; peeling and/or size reduction by cutting) thereby to provide a still at least in part substantially "fresh" produce product which comprises or includes (in any order and/or simultaneously) at least (1) subjecting at least any mechanically disrupted surface to radiation of at least the energy of UV light, and
(2) subjecting the mechanically reduced produce to heating.

Preferably the surface regions only of any mechanically reduced produce has been exposed, if indeed so exposed, to heating to above sublethal conditions.

Preferably the produce is without skin in its mechanically reduced form(s).

Preferably said produce is a peeled and a thereafter sliced or otherwise mechanically reduced quantity (or quantities) of a live fruit or live vegetable.

Preferably the cell components released by the mechanical reduction have at least to some extent been removed (eg; by washing).

Preferably said heating is in an aqueous environment.

Preferably said heating is such as to reduce ethylene production.

Preferably said heating is to depress respiration. Preferably such respiration depression is in addition to reducing ethylene production within the produce.

In one series of embodiments of the invention, the heating is sublethal (ie; does not halt respiration of each mechanically reduced form of the produce).

Preferably said sublethal heating is in an aqueous environment within the temperature range of from 30° C. to 60° C.

Preferably said heating is to achieve an internal produce temperature range of from 35° C. to 45° C.

Preferably said heating is for such time that substantially all of the produce is subjected to the benefit insofar as reduced ethylene production and respiration depression is concerned of the heating procedure.

A preferred regime for heating a fruit (for example, sliced apple) is heating to an internal temperature within the range of from 40° C. to 50° C. for a time period of 5 seconds to 1 hour.

Preferably the heating is in an aqueous environment in the temperature range from 50° C. to 70° C.

Preferably the heating is in an aqueous environment in the temperature range from 50° C. to 60° C.

Preferably the heating is in an aqueous environment in the temperature range for about 2 minutes at about 55° C.

Alternatively the heating is in an aqueous environment in the temperature range for about 1 minute at about 60° C.

Preferably said method also includes
(1) subjecting the produce (prior to mechanical reduction and/or post mechanical reduction) to an anti browning treatment.

Step (3) may be prior to either or both steps (1) and (2), simultaneous with one or both of steps (1) and (2) or after both steps (1) and (2).

Preferably said anti browning treatment is an immersion and/or spraying treatment which has the effect preferably of making available both calcium cations and ascorbate anions.

The anti browning treatment can be with calcium ascorbate or potassium ascorbate or alternatives thereto (such as (preferably substantially equi-molar amounts of) calcium hydroxide and ascorbic acid or potassium hydroxide and ascorbic acid). The ionic form of ascorbate, whether calcium or potassium or sodium, is not critical as long as the solution has been neutralised. Also the use of any ascorbate isomers such as erythorbate is possible.

Preferably said radiation is UV light.

Preferably said UV light is about 254 nm wavelength light.

Preferably the UV radiation (or any other radiation) is sufficient for surface disinfestation of at least bacteria at the surface. For example, for an apple, preferably UV light of about 254 nm wavelength is applied to sliced apple at an intensity of 70 mW sec/cm$^2$ for about 10 seconds.

Preferably said radiation is whilst the produce is being rotated and moved to irradiate all surfaces.

It is believed that the UV disinfestation can kill most, if not all, bacterial and fungi and yeast present in the immersion solution and at the surface.

Preferably in order to deal both with enzymatic browning of the produce in addition to other degradation a preferred procedure for a mechanically reduced fruit and/or vegetable piece, slice or the like ("slice") is a combination of (i) an anti browning system treatment,
(ii) UV radiation, and
(iii) heating in an aqueous environment to reduce respiration and to reduce ethylene production,
steps (ii) and (iii) being effective in concert (simultaneously or otherwise) to reduce or eliminate microbial contamination.

Preferably the mechanically treated produce is substantially clean of cell components released by mechanical treatment preferably prior to any of the steps (i), (ii) and (iii).

Preferably said cleaning is by washing and preferably said washing is in a suitable solution selected from the group consisting of hypochlorite, $ClO_2$ and $CaCl_2$ solutions.

In still a further aspect the present invention consists in a method of enhancing food safety and longevity (ie; preserving) fresh fruit and/or fresh vegetables which comprises or includes (preferably after skin removal if desired or required)

a mechanical size reduction procedure (eg; cutting, dicing or slicing—hereafter "slicing").
optionally (but preferably) cleaning the surface of the mechanically reduced fruit and/or vegetable,
and (in any order, and/or simultaneously in whole or in part) subjecting the sliced product to
(i) an anti oxidant impregnation,
to (ii) UV light or higher energy radiation surface treatment, and
(iii) (preferably in an aqueous phase) heating so as to at least reduce ethylene production and at least depress respiration,
steps (ii) and (iii) being effective in concert (simultaneously or otherwise) to reduce or eliminate at least microbial contamination,
thereby to provide a still at least substantially "fresh" produce product.

Preferably said sublethal heating is in an aqueous environment within the temperature range of from 30° C. to 50° C.

Preferably said heating is to achieve an internal temperature in the temperature range of from 35° C. to 45° C.

Preferably said heating is for such time that substantially all of the produce is subjected to the benefit insofar as reduced ethylene production and respiration depression is concerned of the heating procedure.

A preferred regime for heating a fruit (for example, sliced apple) is heating to achieve an internal temperature within the range of from 40° C. to 50° C. for a time period of 5 seconds to 1 hour.

To achieve an internal temperature in the desired range, the aqueous heating can be to about 70° C. with exposure thereto for a short period of time.

Therefore for this purpose temperatures as high as 70° C. for the aqueous environment, but with exposure limited in time to such temperatures, can be used.

This short time/temp treatment does not raise the internal temperature of the fruit/vegetable to blanching temperatures i.e. above 60° C. Internal temperatures above 50° C. are or can be lethal.

Preferably the heating is from about 2 minutes at 55 ° C.

Alternatively the heating is for about 1 minute at 60° C.

Preferably said antioxidant impregnation is at a level beyond that to control browning alone (eg; preferably is of calcium and ascorbate or any equivalent [eg; calcium hydroxide and ascorbic acid]) ie; preferably is to a level which will also enhance the preservation of flavour.

In yet a further aspect the present invention consists in a method of impregnating fruit and/or vegetables with an anti oxidant effective to reduce browning which comprises or includes making available in solution for uptake (eg; by dipping and/or spraying) both calcium and ascorbate ions.

Preferably substantially equi molar amounts of calcium and ascorbate ions are provided.

Preferably the level of anti oxidant impregnation is at a level beyond that needed for anti browning alone and is at a level which enhances flavour retention (particularly at abusive temperatures).

In still further aspects the invention is produce treated by a method of the present invention in any of its aspects.

BRIEF DESCRIPTION OF THE DRAWINGS

Preferred embodiments of the present invention will now be described with reference to the accompanying drawings in which.

Figure 1:
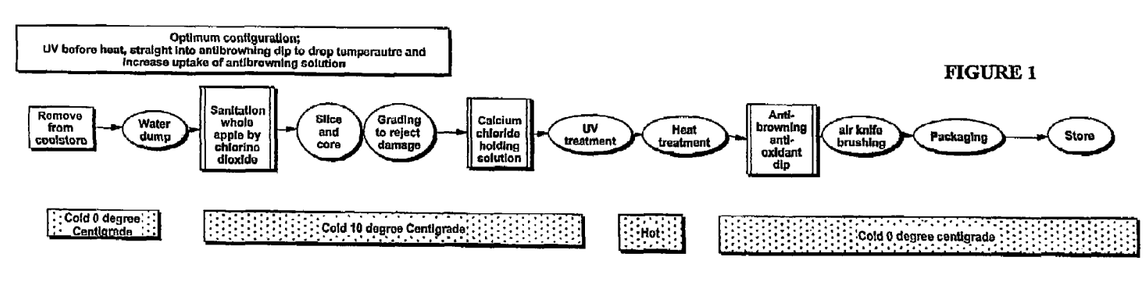
FIG. 1 shows a preferred overall process for the treatment of apple so as to produce apple slices having a likely shelf life when maintained chilled (ie; consistently below 4° C.) for a period of greater than 21 days.

An optimum process in accordance with the present invention is as set out in FIG. 1. Here the UV treatment is applied prior to heating but with the heating itself occurring prior to the anti-browning dip, the effect of the dip being to drop temperature and to increase uptake of the desired anti-browning solution.

FIG. 1 shows a whole series of processing steps deemed appropriate and shows in respect of the flow diagram the usual temperatures of the apple pieces over such processing stages.

Figure 2:
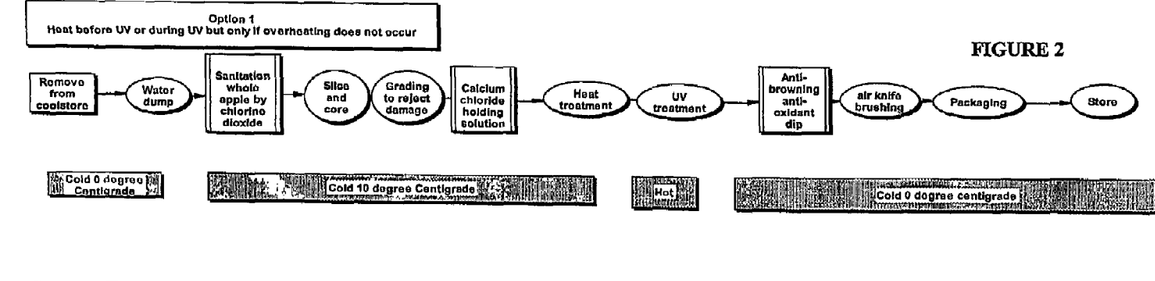
FIG. 2 shows another viable process option.

FIG. 2 shows an option to the optimum procedure of FIG. 1. Here the heating may be before the UV treatment and/or during the UV treatment but only if overheating does not occur. As indicated earlier it is desirable that the heating be confined to a range of from about 40° C. to about 60° C. for a time period of about 5 seconds to about 1 hour. Of course the higher the temperature the shorter the dwell time for uptake.

Figure 3:
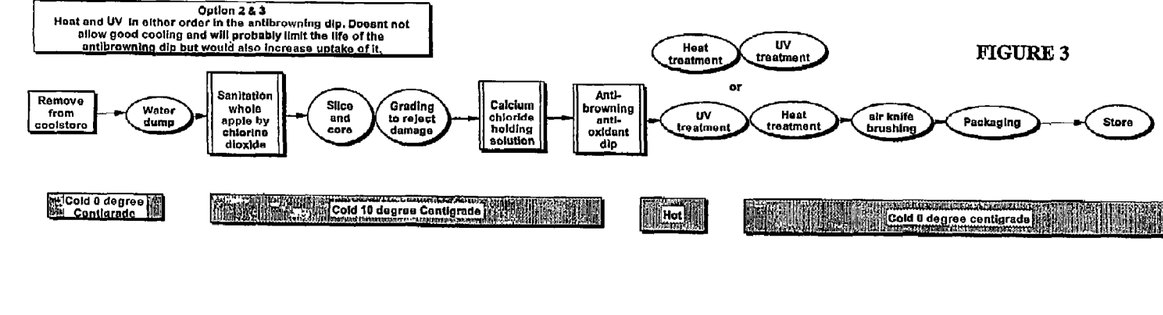
FIG. 3 shows still other viable process options.

FIG. 3 shows two further options to the option of FIG. 2. In this case the anti-browning dip is utilised prior to a sequence of either (i) UV treatment then heat treatment or (ii) heat treatment then UV treatment. An additional process may even have those treatments occurring simultaneously. Do note however that with the options of FIG. 3 such heating in the anti-browning dip is less desirable since it does not allow good cooling and will probably limit the life of the anti-browning dip. Nevertheless it may also increase the uptake of the anti-browning antioxidant to dip.

DETAILED DESCRIPTION OF THE INVENTION

The trialing referred to hereinafter is in an aqueous environment held to sublethal temperatures.

Preferably heating is in an aqueous environment within the temperature range of from 30° C. to 60° C.

Preferably said heating is to an internal product temperature range of from 35° C. to 45° C.

Preferably said heating is for such time that substantially all of the produce is subjected to the benefit insofar as reduced ethylene production and respiration depression is concerned of the heating procedure.

A preferred regime for heating a fruit (for example, sliced apple) is heating in an aqueous environment within the range of from 40° C. to 55° C. for a time period of 5 seconds to 1 hour.

Preferably the heating is from about 2 minutes at 55 ° C.

Alternatively the heating is for about 1 minute at 60° C.

Evaluation Trials A:

Research Design:

Two series of partial factorial trials were undertaken with Fuji-apples.

The trials were carried out using combinations of dip treatments and the physical treatments of heating and UV light of about 254 nm wavelength applied to sliced apple at an intensity of 70 mW sec/cm$^2$ for about 10 seconds. The apple slices were assessed after storage to determine the critical variables, synergistic combinations and optimum ranges that would result in a product with a shelf life of at least 21 days and minimum food safety risk. Modified atmosphere storage, although beneficial, was avoided because of industrial complexity and the need for specialist packaging.

The first series of trials (TRIAL 1) tested the:

Effect of calcium chloride dip pre-treatment on slice quality

Benefit of UV treatment on microbial spoilage

Benefit of heat treatment for various times on freshness and spoilage

Nature of the anti-browning dip and its concentration on slice quality

Benefits of additional nutrients such as sugars and minerals in the anti-browning dip.

Following these a second series of trials (TRIAL 2) tested the:

Effect of UV treatment on microbial spoilage

Effect of heat treatment time on freshness and spoilage

Combination of UV and heat treatments

Effect of anti-browning dip concentration on slice quality

Effect of storage temperature abuse on the shelf life.

In each case treatments were compared to a standard dip of 5% calcium ascorbate and the Nature Seal commercial product from Mantrose Haeuser, applied according to the instructions supplied with the formulation.

Analytical Methods:

Analyses were carried out as follows:

Appearance was assessed visually compared to a fresh slice and every treatment was photographed to record colour and possible disorders on the slices.

Taste was informally assessed by at least 3 people for each sample who independently recorded their assessment on a 5 point hedonistic scale using the reference of a fresh apple slice.

Firmness was instrumentally assessed using an Instron texture meter equipped with a 5.0-mm cylindrical probe.

Colour was instrumentally assessed for L, a, b, colour space using a Minolta colorimeter.

Microbiological load was determined on selected key treatments by Total Aerobic Plate Count (TPC) after 21 days storage. In TRIAL 1 microbial growth was assessed at 22° C. and 35° C. but in TRIAL 2 only 22° C. was used because if was more sensitive to the type of low temperature spoilage organism found on the apple slices.

Results and Process Recommendations:

Pre-Treatment Solution One:

Apples can be contaminated by bird faecal material in the orchard or acquire rots and infections that can grow on apple slices. Brushing and washing of the whole apple in chlorine dioxide (2-5 ppm) prior to slicing is recommended as a food grade HACCP step to treat any surface microbial contamination before slicing. Chlorine dioxide is superior to conventional hypochlorite in that it can treat pathogenic zoospores that can be present in animal or bird faecal contamination. It offers the additional advantages of low smell and low effective treatment concentrations compared to hypochlorite.

Pre-Treatment Solution Two:

Once sliced the apple pieces should be washed to remove damaged cellular material that would otherwise go brown and contaminate the anti-browning dip solution. A liquid medium is also required as a water flume for the heat and UV steps. Therefore the effect of calcium chloride washing after slicing, was tested in TRIAL 1. However, slices held in a calcium chloride solution (either 0.1% or 2% w/v) for 10 minutes prior to further treatment, did not perform better after 21 days storage than slices held in water alone.

In spite of these results, other studies have shown that calcium chloride can inhibit browning during apple slice preparation and help stabilise cell membranes from heat and osmotic damage. Therefore a post-slicing wash and water flume treatmnent of at least 0.1% w/v calcium chloride is recommended as a low-cost method for introducing robustness to the industrial process.

Effect of Heat and UV on Microbiological Spoilage:

Storage at 0° C. completely inhibited visible microbial spoilage and gave very low TPC levels. However, when slices were subjected to 7 days at 0° C. then 7 days at 12° C. both the Mantrose Haeuser and the 5% calcium ascorbate control samples had at least one visible small microbial growth on most slices. In contrast when similar slices were subjected to UV irradiation for at least 10 seconds, plus heat treatment for more than 4 minutes, and then dipped in 5% calcium ascorbate, they showed consistently low to zero visual microbial spoilage.

A combination of both UV and heat treatment was needed to consistently achieve this control of visible microbial spoilage when subjected to the storage abuse temperatures.

The freshness and taste of heat and UV treated samples was not impaired provided the calcium ascorbate dip was at adequate levels for the storage temperature. However the microbial TPC count at 22° C. was increased by heat and UV treatments in comparison to untreated control samples but this did not impact on product quality. The increased levels of microbial count were not detectable visually and the treated samples had a better appearance than the untreated samples.

For food safety purposes the heat treatment and UV treatment conditions were both at sufficient levels to kill Listeria. Together they constituted a hurdle technology that should be an effective HACCP step for food safety.

Anti-Browning Dip Treatment:

The calcium ascorbate based dip treatment was selected as prior trials had shown that it was the best food grade option available. The formulation used is based on calcium and ascorbic acid.

Attempts were made in TRIAL 1 to improve the formulation by the addition of various sugars and mineral formulations. No significant improvements in product quality due to these additives were noted after the 21 day 0° C. storage shelf life trial.

In TRIAL 2 the effect of the calcium ascorbate concentration on taste and colour were determined at optimum (0° C.) and abusive (8 and 12° C.) storage temperatures. The optimum storage temperature gave acceptable apple slices in all treatments but the best flavour comments were with heat treated samples.

In contrast almost all the samples subjected to temperature abuse, including product treated with the antibrowning dip of Mantrose Haeuser at the recommended levels, developed detectable bitter or stale flavours. Only samples subjected to a combination of UV for 10 seconds and heat for 6 minutes and final dipping in either 6% or 8% calcium ascorbate solution did not develop obvious bitterness at the higher storage temperatures.

In both trials and at all treatment combinations colour and firmness changes very little over the storage times even at abusive storage temperatures. The exception was samples dipped in just 2% calcium ascorbate where detectable browning occurred on the surface.

It is therefore concluded that higher concentrations of antioxidant are needed to withstand storage temperature abuse and reliably delivery a good flavoured product. The mininum level of calcium ascorbate needed will depend on the storage time and conditions but optimum levels in the 6-8% range are likely. The anti-browning dip is the most expensive item in the process and a high efficiency of utilisation will be desired. To achieve this will require automated control of the dip concentration during use and re-use.

Conclusions:

A process has been demonstrated that can preserve flavour firmness and colour characteristics of the sliced apples for greater than 21 days dependent on storage temperatures.

Apple slices held at 0° C. for 21 days preserved their organoleptic characteristics and were similar to fresh cut apples. However, at this temperature and after 21 days, samples that were UV and heat treated, recorded better comments from the panellists than those samples that were only subjected to either UV or heat treatments.

Apple slices held at 0° C. for seven days then at storage temperatures 8 or 12° C., deteriorated to the point of unacceptability in seven to ten days. However samples treated by:
  a combination of UV for at least 10 seconds and minimum of 6 minutes heat immersion at 44° C. and
  a final dip in more than 5% to 8% calcium ascorbate solution,
  are acceptable after seven days and provide a product far superior to Mantrose Haeuser recommended (see aforementioned U.S. patents) dip only treated slices.

Evaluatin Trials B:

General Method of Sample Preparation:

Aseptic technique was used at all stages. The apples were washed in 5 ppm chlorine dioxide for 10 minutes, cut into 8 slices and the cores removed. The slices were rinsed in 0.1% CaCl2 or water, and UV irradiated in a UV transparent Teflon tube surrounded by 3 mercury vapour lights equi-distant around the sample for the defined time. The irradiation intensity was 90 μW.s/cm². The whole apparatus was surrounded by a brushed stainless steel tube to reflect UV light. The slices were then heated in 0.1% CaCl2 or water for the defined time and temperature and dipped into 0-4° C. calcium ascorbate. The slices were drained under sterile air flow for 5 minutes and packaged into zip-lock polyethylene bags for storage at the defined temperature for the defined time.

EXAMPLE 1

Effect of UV and Heat Treatment on the Microbial Count of Braeburn Apple Slices

| Treatment Code | UV treatment UV 50 sec 0.1% CaCl2 | Heat Treatment Heat 6 minutes 50° C. 0.1% CaCl2 | DIP calcium ascorbate (% w/w) 8% | Microbial count TPC 22° C. cfu/g |
|---|---|---|---|---|
| S2-No UV/Heat | | | X | 80 |
| S3-UV but No Heat | X | | X | 60 |
| S4-UV and Heat | X | X | X | <10 |

Conclusion: It can be seen that the combination of UV and heat in Treatment S4 gave the lowest microbial count.

EXAMPLE 2

Determination of Maximum Heating Time of Braeburn Apple Slices to Maintain an "As Fresh" Appearance Apple Slice.

Braeburn apples were prepared by the usual method and heat treated at different times and temperatures as in the Table. A thermocouple was inserted into a slice in every run to record the temperature at the thickest part of the slice. All slices were dipped into cold 8% calcium ascorbate, drained and stored in zip lock polyethylene bags at 8° C.

Method of assessment: Apples (3 per treatment) in triplicate were visually assessed up to 25 days storage and the presence of any discoloration or visible microbial spoilage in the bag was rated as unacceptable.

| | Variables | | Maximum internal temperature | Result Days at 8° C. |
|---|---|---|---|---|
| Treatment Name | Heating Temperature 0.1% CaCl2 ° C. | Time minutes | in slice after heating Temperature ° C. | that slice appearance was "as fresh" Average (limits) |
| Control a | 0 | 0 | — | 8.86 (8-10) |
| A1a | 50 | 1 | 25 | 10.00 (6-12) |
| A2a | 50 | 2 | 34.5 | 4.33 (1-6) |
| A3a | 50 | 4 | 37.2 | 7.00 (3-10) |
| A4a | 50 | 6 | 45 | 8.33 (1-18) |
| A5a | 55 | 1 | 35.8 | 19.33 (8-25) |
| A6a | 55 | 2 | 39.5 | 25 (25) |
| A7a | 55 | 4 | 47 | 4.00 (3-6) |
| A8a | 55 | 6 | 50 | 4.00 (3-6) |
| A9a | 60 | 1 | 24 | 14.33 (1-21) |
| A10a | 60 | 2 | 35.6 | 0 |
| A11a | 60 | 4 | 50 | 0 |
| A12a | 60 | 6 | 55 | 0 |

At lower heating treatmnent temperatures microbial spoilage was apparent and was shown by pink or black spots on the apple slices. At higher temperature/time heat treatment combinations heat damage became apparent on storage as loss of colour in the skin and/or translucency of the flesh. Some individual slices showed spot bruising or similar defects and these were also rejected.

Conclusions: The apples could be treated at 55° C. for 2 minutes and still retain acceptable "as fresh" appearance after storage for up to 25 days at abuse temperatures.

EXAMPLE 3

Effect of UV and Heat on Microbial Count After Storage at Different Temperatures Braeburn apples were treated for 30 seconds with UV and then heat treated at the defined temperatures in the table and dipped for 2 minutes in 8% calcium ascorbate. After storage in sealed polyethylene bags for the stated time the samples were tested for microbial contamination using a total plate count (TPC) procedure at 22° C.

The samples were independently assessed by a panel of 4 people for acceptable taste and appearance.

| TREATMENT | HEATING Temp °C. in 0.1% CaCl2 | HEATING Time minutes | DIP 8% Calcium ascorbate | Microbial count TPC cfu/gm | | | | | | | | |
|---|---|---|---|---|---|---|---|---|---|---|---|---|
| Storage temperature °C. | | | | 0 | 0 | 0 | 4 | 4 | 4 | 8 | 8 | 8 |
| Storage time Days | | | | 0 | 16 | 21 | 0 | 16 | 21 | 0 | 16 | 21 |
| Control | No heat | 2 | X | X | na | 1300 | X | na | 23,000 | na | X | 1,700 | 250,000 |
| SAMPLE 1 (S1) | 50 | 2 | X | X | na | 10 | X | na | 760 | na | X | 6,900 | 1,300,000 |
| SAMPLE 2 (S2) | 55 | 2 | X | X | na | <10 | X | na | <10 | X | 68,000 | 11000 |

Results: Microbial Counts

A combination of UV and heat treatment was able to substantially eliminate microbial growth compared to the control when stored at 0 degrees for up to 21 days. Substantial control was found when stored at 4° C. for 21 days for short time treatments at both 50 and 55° C. When stored at 8° C. only the 55 degree treated sample had microbial counts below 100,000 /gm.

Results: Taste Assessment

Off-flavours became apparentin the control sample after 16 days at4° C. and 8° C. All samples were acceptable after 21 days at 0° C. and acceptable but changes noted after 21 days at 4° C. However after 21 days at 8° C. only the 55° C. treated sample was acceptable. The control sample was not tasted due to visible microbial growth, which was not present on the heat-treated samples.

Conclusion: Unexpectedly the treatment at 55° C. was able to substantially prevent microbial growth when stored at 8° C. This storage temperature was high enough to result in substantial microbial growth on the control indicating that treatments had decreased the microbial contamination on the heated sample to very small levels.

EXAMPLE 4

Effect of UV and Heat on Microbial Growth of Apple Slices

Braeburn apple slices were prepared and washed in 0.1% calcium chloride and UV treated for 30 s followed by heat treatment for 2 minutes or just heat treated for 2 minutes as indicated in the Table. All samples were dipped in 8% calcium ascorbate. The samples were then in sealed polyethylene bags and stored at different temperatures. The microbial load was determined after 14 days using a total plate count (TPC) procedure at 22 ° C.

| TREATMENT | UV 30 seconds in 0.1% CaCl2 | HEATING Temp ° C. in 0.1% CaCl2 | Storage conditions Days- ° C. No storage Microbial count TPC cfu/g | 0° C. | 4° C. |
|---|---|---|---|---|---|
| | | | 40 | 410 | 900 |
| Heat Only | | 50 | <10 | 20 | 70 |
| Heat Only | | 55 | 10 | 10 | 20 |
| UV only | X | X | 10 | 10 | 800 |
| Heat and UV | X | 50 | <10 | <10 | 520 |
| Heat and UV | X | 55 | <10 | — | <10 |

Conclusions Heat and UV treatments gave the best results in reducing microbial loads.

EXAMPLE 5

Effect of UV and Heat on Microbial Growth of Apple Slices Innoculated with *Lactocoocus lactis*.

Braeburn apple slices were prepared and washed in tap water containing approx. 1000 *Lactocoocus lactis* cells per millilitre, the slices were then washed in 0.1% calcium chloride and UV treated for 30 s followed by heat treatment for 2 minutes or just heat treated for 2 minutes as indicated in the table. All samples were dipped in 8% calcium ascorbate. The samples were then in sealed polyethylene bags and stored at different temperatures. The microbial load was determined after 0 and 21 days using a total plate count (TPC) procedure at 22° C.

| TREATMENT | Inoculation *Lactobacillus* $10^4$ with tap water | UV time in 0.1% CaCl2 Seconds | Heating Temperature ° C. | Microbial load TPC cfu/g |
|---|---|---|---|---|
| Code | | | | 22° C. |
| Control (Q) | | | | 50 |
| QL | X | | | 10 |
| 2 | X | 2 | | 10 |
| 10 | X | 10 | | 10 |
| 30 | X | 30 | | 10 |
| 60 | X | 60 | | <10 |
| SH50 | X | | 50 | 10 |
| SH55 | X | | 55 | <10 |
| SH50 U30 | X | 30 | 50 | 10 |
| SH55 U30 | X | 30 | 55 | <10 |

Conclusions: Both heat and UV could reduce the microbial load to lower than the detectable limit.

EXAMPLE 6

Effect of UV and Heat on the Microbial Contamination of Freshcut Carrots

"Baby" carrots snack food sealed in polyethylene bags were purchased from a local retail store. The produce was all from the same batch, was fresh with no visible microbial spoilage and was purchased 6 days in advance of the "best before" date.

The carrots were washed in 0.1% calcium chloride and then UV or heat treated for 2 minutes as indicated in the Table.

The samples were drained and dried for 5 minutes in sterile air flow then bagged in zip lock polyethylene bags and stored at different temperatures. The microbial load was determined as indicated using a total plate count (TPC) procedure at 22° C.

| TREATMENT | UV UV time In 0.1% CaCl seconds | HEATING Heating temperature in CaCl2 ° C. | Microbial count TPC cfu/g Storage conditions |
|---|---|---|---|
| Code (SP) as received ex supermarket | | | No storage >250,000 |
| | | | >250,000 |
| Control | 0 | — | >250,000 |
| U2 | 2 | — | >250,000 |
| U10 | 10 | — | >250,000 |
| U30 | 30 | — | >250,000 |
| U60 | 60 | — | 130,000 |
| H45 | 0 | 45 | >250,000 |
| H50 | 0 | 50 | 170,000 |
| H55 | 0 | 55 | 9,200 |
| H45 U30 | 30 | 45 | 160,000 |
| H50 U30 | 30 | 50 | 45,000 |
| H55 U30 | 30 | 55 | 53000 |

Conclusions: Both heat and UV contributed to lowering the microbial load of freshcut carrots and made a product that had an "as fresh" appearance.

The invention claimed is:

1. A method for producing a substantially fresh produce product that has been subject to a mechanical reduction while still keeping the mechanically reduced product as a substantially fresh, respiring produce product, said method comprising the steps of
   (1) washing the mechanically reduced produce product,
   (2) subjecting at least any mechanically disrupted surface of the mechanically reduced product to UV light, and
   (3) subjecting the mechanically reduced produce product to heating in an aqueous environment within a range of from 40° C. to 60° C. for a time period of 5 seconds to 6 minutes such that the heating reduces ethylene production and depresses respiration in the substantially fresh respiring produce product,
   wherein steps (2) and (3) are carried out in either order or simultaneously.

2. The method of claim 1, further comprising the step of
   (4) subjecting the produce product before or after mechanical reduction to an anti browning treatment.

3. The method of claim 2, wherein the anti browning treatment is an antioxidant treatment.

4. The method of claim 3, wherein erythorbate anions are used.

5. The method of claim 2, wherein the anti browning treatment is carried out after steps (2) and (3).

6. The method of claim 5, wherein said anti browning treatment is at least one of an immersion and a spraying treatment.

7. The method of claim 5, wherein at least one of ascorbate anions and any isomer thereof is used in the anti browning treatment.

8. The method of claim 1, wherein the produce product is a sliced apple and UV light of about 254nm wavelength is applied to the sliced apple at an intensity of about 70 mW sec/cm² for about 1-60 seconds while the sliced apple is rotated and moved to irradiate all surfaces.

9. The method of claim 1, wherein cell components released by the mechanical reduction are removed.

10. The method of claim 1, wherein said produce product in a mechanically reduced form is a peeled and a thereafter sliced or otherwise mechanically reduced quantity of the respiring produce product.

11. The method of claim 1, wherein said heating of the produce product keeps an internal temperature of the mechanically reduced produce product within the range of from 30° C. to 50° C.

12. The method of claim 1, wherein said heating is such that substantially all of the mechanically reduced produce product has reduced ethylene production, and respiration depression.

13. The method of claim 1, wherein said UV light is about 254 nm wavelength light.

14. The method of claim 13, wherein the produce product is a sliced apple and UV light of about 254 nm wavelength is applied to the sliced apple at an intensity of about 70mW sec/cm² for about 1-60 seconds whilst the sliced apple is being rotated and moved to irradiate all surfaces.

15. The method of claim 1, wherein the UV light provides surface disinfestation of at least bacteria at the surface.

16. The method of claim 1, wherein said washing is in or by a solution selected from the group consisting of hypochlorite, $ClO_2$ and $CaCl_2$ solutions.

17. The method of claim 1, wherein the temperature of the aqueous environment is 40° C. to 55° C.

18. The method of claim 17, wherein the temperature of the aqueous environment is 45° C. to 55° C.

19. The method of claim 1, wherein said heating keeps an internal temperature of the produce in the range of 35° C. to 45° C.

20. The method of claim 1, wherein the UV radiation is applied for about 1 to 60 seconds.

21. The method of claim 1, wherein the mechanically reduced produce product is heated for a time period of from 1 to 4 minutes.

22. The method of claim 21, wherein the mechanically reduced produce product is heated for a time period of from 1 to 2 minutes.

23. The method of claim 22, wherein the mechanically reduced produce product is heated for a time period of 2 minutes at 55° C.

24. The method of claim 22, wherein the produce product is heated for 1 minute at 60° C.

25. The method of claim 1, wherein the produce product is fruit.

26. The method of claim 25, wherein the fruit is apples, pears or persimmons.

27. The method of claim 25, wherein the produce product is sliced.

28. The method of claim 1, wherein the produce product is vegetables.

29. The method of claim 28, wherein the vegetables are squash, pumpkin, carrots or radish.

30. The method of claim 28, wherein the produce product is sliced.

31. A method for producing a substantially fresh produce product that has been subject to a mechanical reduction while still keeping the mechanically reduced produce product as a substantially fresh, respiring produce product, said method comprising the steps of
   (1) washing the mechanically reduced produce product,
   (2) subjecting at least any mechanically disrupted surface of the mechanically reduced produce product to UV light irradiation,
   (3) then subjecting the mechanically reduced produce product to heating in an aqueous environment within a range of from 40° C. to 60° C. for a time period of 5 seconds to 6 minutes such that the heating reduces ethylene production and depresses respiration in the substantially fresh respiring produce product, and (4) then subjecting the produce product to an anti browning treatment.

32. The method of claim 31, wherein said anti browning treatment is at least one of an immersion and a spraying treatment.

33. The method of claim 32, wherein at least one of ascorbate anions and any isomer thereof is used in the anti browning treatment.

34. A method for producing a substantially fresh produce product that has been subject to a mechanical reduction while still keeping the mechanically reduced product as a substantially fresh, respiring produce product, said method comprising the steps of (1) washing the mechanically reduced produce product, (2) subjecting the mechanically reduced produce product to heating in an aqueous environment within a range of from 40° C. to 60° C. for a time period of 5 seconds to 6 minutes such that the heating reduces ethylene production and depresses respiration in the substantially fresh, respiring produce product, (3) then subjecting at least any mechanically disrupted surface of the mechanically reduced produce product to UV light irradiation, and (4) then subjecting the produce product to an anti browning treatment.

35. A method for producing a substantially fresh produce product that has been subject to a mechanical reduction while still keeping the mechanically reduced produce product as a substantially fresh, respiring produce product, said method comprising the steps of (1) washing the mechanically reduced produce product.

(2) subjecting the mechanically reduced produce product to an anti browning treatment, and then, in either order, or simultaneously;

2(A) subjecting at least any mechanically disrupted surface of the mechanically reduced produce product to radiation of UV light, and 2(B) subjecting the mechanically reduced produce product to heating in an aqueous environment within a range of from 40° C. to 60° C. for a time period of 5 seconds to 6 minutes such that the heating reduces ethylene production and depresses respiration in the substantially fresh, respiring produce product.

* * * * *

UNITED STATES PATENT AND TRADEMARK OFFICE
CERTIFICATE OF CORRECTION

PATENT NO. : 7,601,376 B2  Page 1 of 1
APPLICATION NO. : 10/487263
DATED : October 13, 2009
INVENTOR(S) : Roger Anthony Stanley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 856 days.

Signed and Sealed this

Fifth Day of October, 2010

David J. Kappos
*Director of the United States Patent and Trademark Office*